(12) United States Patent
Chen (10) Patent No.: US 7,218,897 B2
(45) Date of Patent: May 15, 2007

(54) EXTENDED MICROPHONE WITH POSITIONING DISPLAY

(75) Inventor: Kuo-Chung Chen, Taipei Hsien (TW)

(73) Assignee: Jdi Jing Deng Industrial Co., Ltd., Taipei Hsien (TW)

( * ) Notice: Subject to any disclaimer, the term of this patent is extended or adjusted under 35 U.S.C. 154(b) by 8 days.

(21) Appl. No.: 11/189,877

(22) Filed: Jul. 27, 2005

(65) Prior Publication Data

US 2006/0135088 A1    Jun. 22, 2006

(30) Foreign Application Priority Data

Dec. 22, 2004    (TW) .............................. 93220661 U (51) Int. Cl.
*H04B 1/38*    (2006.01)
(52) U.S. Cl. ............... 455/90.2; 455/550.1; 455/456.1; 455/457; 343/702; 343/718
(58) Field of Classification Search ............... 455/425, 455/575.1, 575.2, 575.6, 90.3, 569.1; 343/702, 343/718; 340/539.22; 345/211
See application file for complete search history.

(56) References Cited

U.S. PATENT DOCUMENTS

| | | | |
|---|---|---|---|
| 6,763,226 B1* | 7/2004 | McZeal, Jr. ................. | 455/90.2 |
| 2003/0160725 A1* | 8/2003 | Baxter et al. ............... | 343/702 |
| 2005/0187675 A1* | 8/2005 | Schofield et al. .............. | 701/2 |
| 2005/0237186 A1* | 10/2005 | Fisher et al. ........... | 340/539.22 |
| 2006/0055691 A1* | 3/2006 | Bursett ........................ | 345/211 |
| 2006/0160580 A1* | 7/2006 | Chen ........................ | 455/569.1 |

* cited by examiner

*Primary Examiner*—Temica Beamer
*Assistant Examiner*—Joy Contee
(74) *Attorney, Agent, or Firm*—Troxell Law Office, PLLC (57) ABSTRACT

An extended microphone for a radio communication equipment is disclosed. The extended microphone includes a microphone body; an adapter for connecting the extended microphone with the radio communication equipment; a GPS module disposed on the microphone body for providing a positioning message; and a display module disposed on the microphone body and connected with the GPS module for receiving the positioning message and displaying the positioning message thereon.

14 Claims, 7 Drawing Sheets

EXTENDED MICROPHONE WITH POSITIONING DISPLAY

BACKGROUND OF THE INVENTION (a) Field of the Invention

This invention relates to an extended microphone, and more particularly to an extended microphone with a positioning display applied in a radio communication equipment.

(b) Description of the Prior Art

Figure 1:
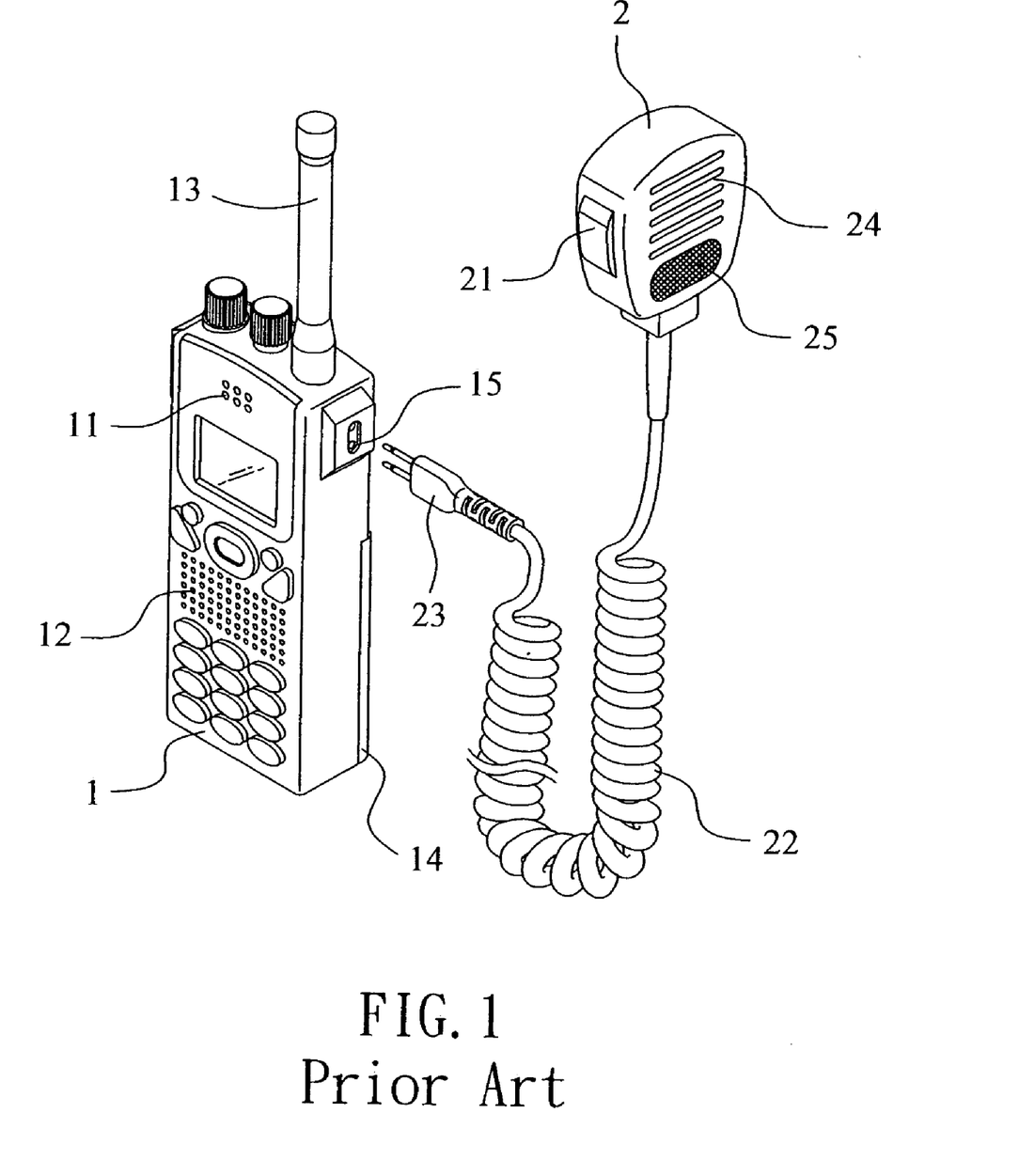
FIG. 1 illustrates an extended microphone for a radio communication equipment according to the prior art.

Generally speaking, radio communication equipments are used for transmitting and receiving voice messages. According to the prior art, radio communication equipments could include at least a transmitter, a receiver, a microphone and a loud speaker. As shown in FIG. 1, the traditional radio communication equipment 1 includes a microphone 11, a loud speaker 12, an aerial 13 and a power set 14, wherein a transmitter and a receiver (not shown in FIG. 1) are also included therein for transmitting and receiving voice messages. This kind of radio communication equipments always is provided powder via batteries; but some radio communication equipments disposed in a car are provided powder via the powder of the car.

When a user speaks to a microphone, his voice messages are transferred into electronic messages. These electronic messages are produced by the transmitter and amplified into radio messages for transmitting to the aerial, and then the radio messages are transmitting into air via the aerial. On the other hand, the aerial of accepting side will receive the radio messages and transmit them to the receiver thereof. The receiver further transfers the radio messages into the original voice message, and then the voice messages are broadcasted via the loud speaker of the radio communication equipment, thereby accepting-side user being able to hear the original voice message from remote user.

In practice, the volume and the weight of the radio communication equipment are too large to be held or carry. Therefore, the radio communication is always performed with an extended microphone 2, as shown in FIG. 1, for facilitating to be performed. Meanwhile the extended microphone 2 further includes a control button 21, an extended line 22, an adapter 23, a microphone 23 and a loud speaker 25. The extended microphone works by means of inserting the adapter 23 of the extended microphone into an interface hole 15 of the radio communication equipment. However, the extended microphone of prior art is introduced for facilitating to perform, but without adding another new functions.

On the other hand, Global Positioning System (GPS) is widely introduced into the car positioning system since 1993. GPS, which is different from the radio communication system, defines longitude and latitude via electric waves from plural artificial satellites, thereby obtaining the present location. GPS, including three parts—positioning satellites, ground control set, and receiver set, is developed by the Ministry of National Defense of USA, and has been make open to public access or use for commercial and civil use. Positioning system of GPS has 24 satellites respectively disposed on 6 orbits, wherein each one is away from the ground about 20200 kilometers and takes only 12 hours to revolve around the earth. The electronic wave of orbit and time data from each satellite set is provided to the receiver for decoding and transferring into coordinate data. Furthermore, the ground control set is used for tracing and controlling GPS satellites thereby modifying the parameters of normal running and being sure the received coordinate data thereof is correct. The receiver calculates the present location thereof by means of trigonometrical survey in response to the positioning data of at least three satellites. Moreover, the moving speed and time of the receiver could be calculated by harmony with application software. If the weather is fair, the location of the receiver could be calculated more correctly via the data from 4 or more satellites. However, the prior radio communication equipment is limited in radio communication system and could not provide the similar positioning service.

Because the prior radio communication equipment is limited in radio communication system, it can't provide positioning service. Therefore, it needs to provide an extended microphone, which is capable of being attached to a radio communication system and providing positioning service, and can rectify those drawbacks of the prior art and solve the above problems. Meanwhile a traditional radio communication equipment could provide the positioning service by means of introducing the extended microphone according to the present invention without disassembling the radio communication equipment for adding extra functions.

SUMMARY OF THE INVENTION

This paragraph extracts and compiles some features of the present invention; other features will be disclosed in the follow-up paragraph. It is intended to cover various modifications and similar arrangements included within the spirit and scope of the appended claims, and this paragraph also is considered to refer.

It is an object of the present invention to provide an extended microphone for a radio communication equipment, wherein a positioning display is introduced into the extended microphone for providing positioning service without refitting the radio communication equipment.

According to the present invention, the extended microphone for a radio communication equipment includes a microphone body; an adapter for connecting the extended microphone with the radio communication equipment; a GPS module disposed on the microphone body for providing a positioning message; and a display module connected with the GPS module for receiving the positioning message and displaying the positioning message thereon.

Certainly, the positioning message can be a data packet.

Preferably, the extended microphone further includes a power source set connected with the GPS module and the display module for providing the GPS module and the display module with an individual power.

Preferably, the extended microphone further includes a speaker connected with the adapter for receiving a received message from the radio communication equipment and broadcasting the received message thereon.

Certainly, the display module can be a liquid crystal display (LCD).

Preferably, the extended microphone further includes an extended line connected between the microphone body and the adapter.

It is another object of the present invention to provide an extended microphone system for radio communication equipments, wherein at least an extended microphone set with a positioning display is introduced for providing positioning service without refitting the radio communication equipment.

According to the present invention, the extended microphone system for a radio communication equipment includes at least an extended microphone set, wherein the extend microphone set includes a microphone body; an adapter for connecting the extended microphone with the radio communication equipment; a voice-receiving button connected to the microphone body for enabling the microphone body to receive a voice message, wherein the voice message is further transmitted into the radio communication equipment; a GPS module connected to the voice-receiving button for providing a positioning message; a transmitting module connected with the GPS module for transmitting the positioning message; a display module; and a local receiver connected with the display module; and a remote integrated positioning system for providing a condition message, wherein the remote integrated positioning further includes: a positioning-message receiver disposed in the remote integrated positioning system to receive the positioning message of the extended microphone set for acquainting the position of the radio communication equipment thereby obtaining the condition message; and a remote transmitter disposed in the remote integrated positioning system to transmitting the condition message to the local receiver of the extended microphone set thereby displaying the condition message via the display module of the extended microphone set.

Certainly, the voice message can be an analogous signal and the positioning message and the condition message can be both data packets.

Preferably, the extended microphone further includes a power source set for providing the extended microphone set with an individual power, wherein the power source set is a battery.

Certainly, the display module can be a liquid crystal display (LCD).

Preferably, the extended microphone set further includes an extended line connected between the microphone body and the adapter.

According to the present invention, the extended microphone system for a radio communication equipment, includes plural extended microphone sets, wherein each the extend microphone set includes a microphone body; an adapter for connecting the extended microphone with the radio communication equipment; a GPS module disposed on the microphone body for providing a positioning message; a transmitting module connected with the GPS module for transmitting the positioning message; a display module; and a local receiver connected with the display module; and a remote integrated positioning system for providing a condition message, wherein the remote integrated positioning further includes: a positioning-message receiver disposed in the remote integrated positioning system to receive the positioning message of the extended microphone set for acquainting the position of the radio communication equipment thereby obtaining the condition message; and a remote transmitter disposed in the remote integrated positioning system to transmitting the condition message to the local receiver of the extended microphone set thereby displaying the condition message via the display module of the extended microphone set.

Preferably, the extended microphone set further includes a positioning button connected to the GPS module for controlling the GPS module to producing the positioning message.

Preferably, the extended microphone set further includes a voice-receiving button connected to the microphone body for enabling the microphone body to receive a voice message, wherein the voice message is further transmitted into the radio communication equipment.

Certainly, the voice message can be an analogous signal.
Certainly, the positioning message can be a data packet.
Certainly, the condition message can be a data packet.

Preferably, the extend microphone set further includes a power source set for providing the extended microphone set with an individual power.

Certainly, the display module can be a liquid crystal display (LCD).

Preferably, the extended microphone set further includes an extended line connected between the microphone body and the adapter.

The above objects and advantages of the present invention will become more readily apparent to those ordinarily skilled in the art after reviewing the following detailed description and accompanying drawings, in which.

DETAILED DESCRIPTION OF THE PREFERRED EMBODIMENTS

The present invention discloses an extended microphone for a radio communication equipment, and the objects and advantages of the present invention will become more readily apparent to those ordinarily skilled in the art after reviewing the following detailed description. The present invention needs not be limited to the following embodiment.

Figure 2:
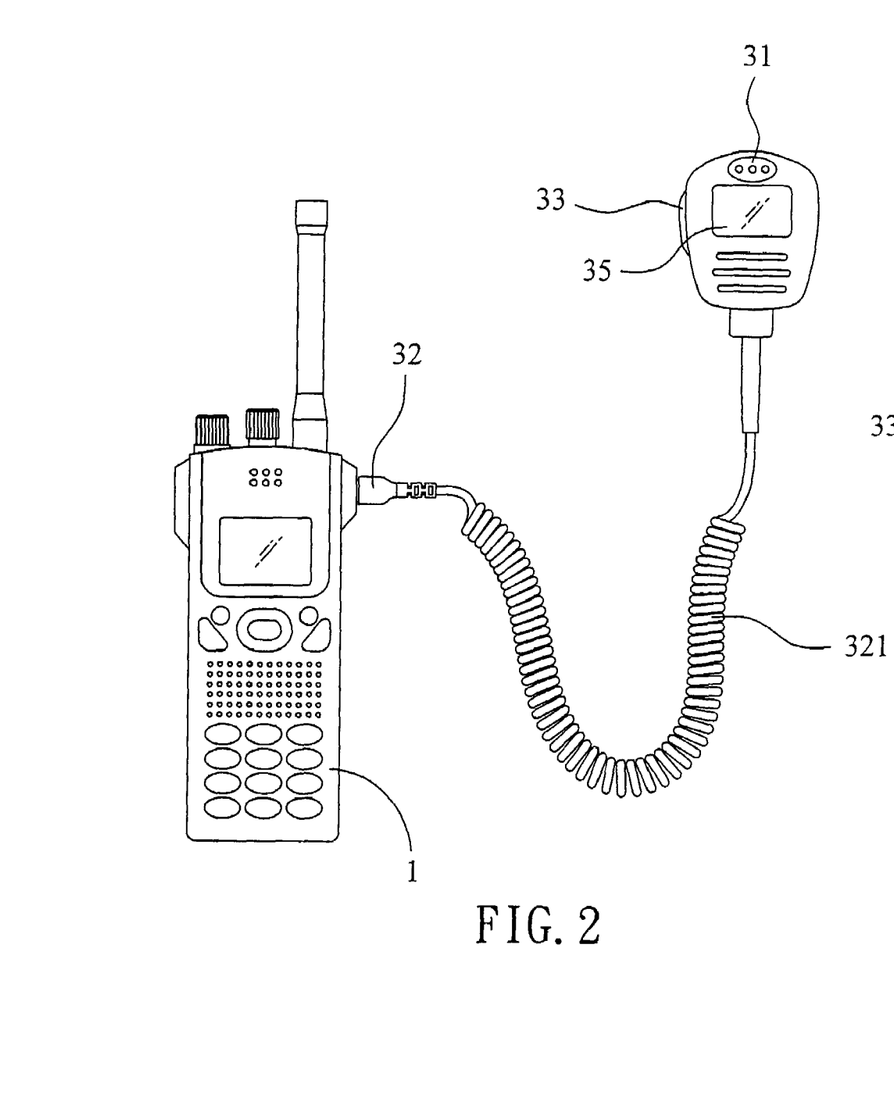
FIG. 2 illustrates a first embodiment of an extended microphone with a positioning display for a radio communication equipment according to the present invention.
Figure 3:
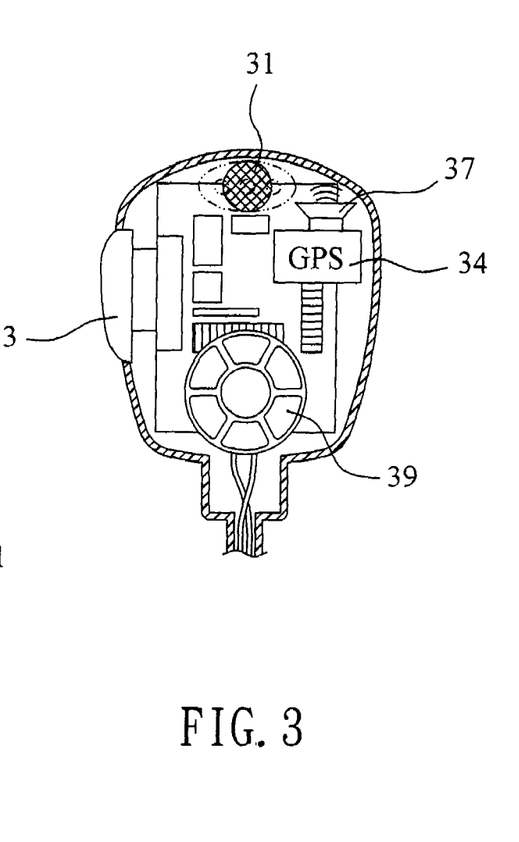
FIG. 3 illustrates a preferred embodiment of an extended mirophone with internal mechanism according to present invention.
Figure 4:
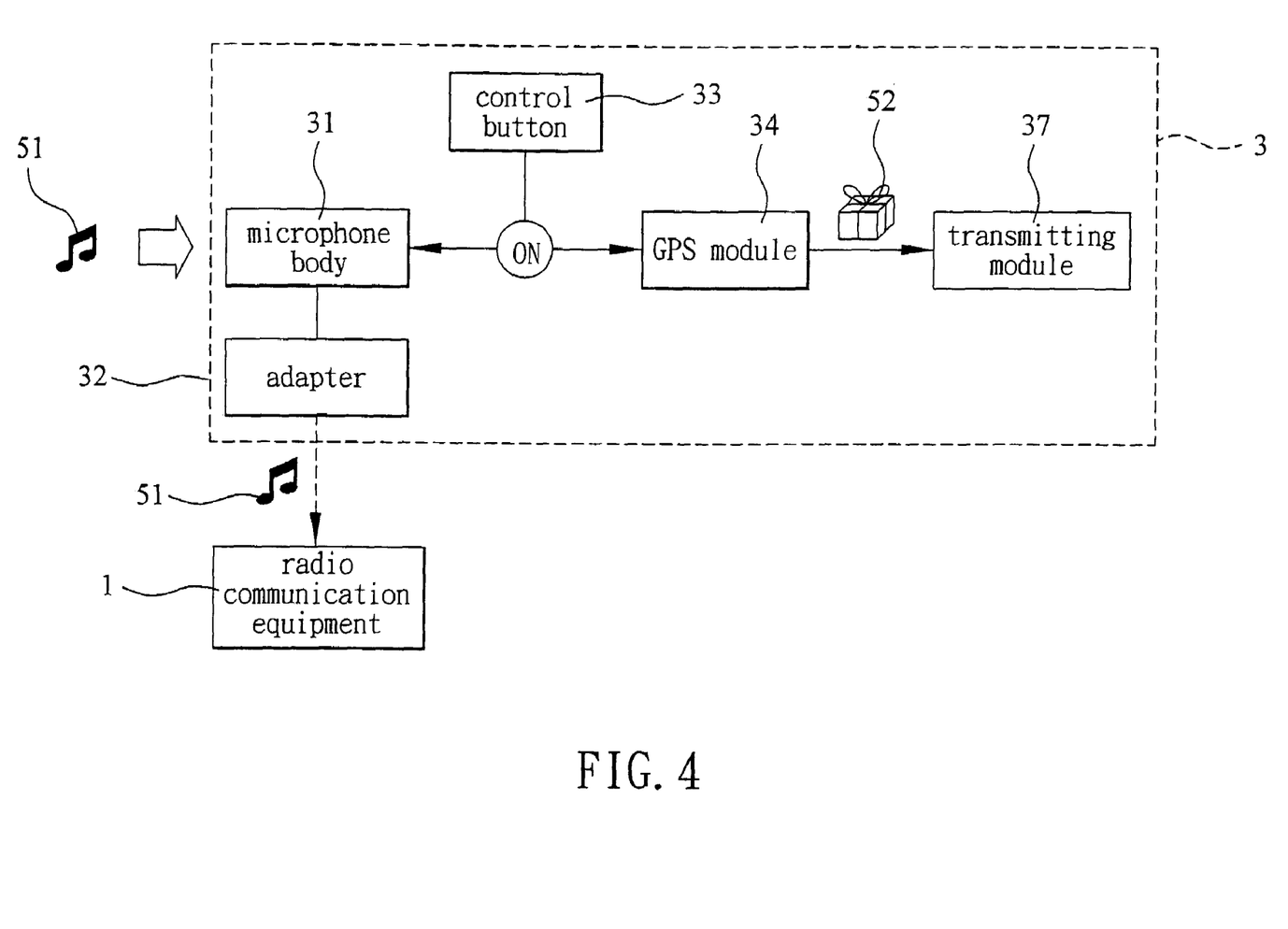
FIG. 4 illustrates a functional diagram of an extended microphone with a positioning display for a radio communication equipment according to the present invention.

Please refer to FIGS. 2, 3 and FIG. 4. They illustrate a first embodiment of an extended microphone with a positioning display for a radio communication equipment 1 according to the present invention. The extended microphone of the present invention includes a microphone body 31; an adapter 32 for connecting the extended microphone with the radio communication equipment 1; a control button 33 connected with the microphone body 31 for enabling the microphone body 31 to receive a voice message 51, wherein the voice message 51 is further transmitted into the radio communication equipment 1; a GPS module 34 disposed on the microphone body 31 for providing a positioning message 52; and a display module 35 disposed on the microphone body 31 and connected with the GPS module 34 for receiving the positioning message 52 and displaying the positioning message 52 thereon, thereby a user being able to acquaint his position and the information around the surrounding. Meanwhile, the positioning message 52 can be a data packet, and the display module 35 can be a liquid crystal display (LCD), wherein the positioning message 52 is displayed in form of characters or figures.

In practice, the extended microphone further includes a speaker 39 connected with the adapter 32 for receiving a received message from the radio communication equipment 1 and broadcasting the received message thereon. Certainly, the extended microphone can further include an extended line 321 connected between the microphone body 31 and the adapter 32.

Figure 5:
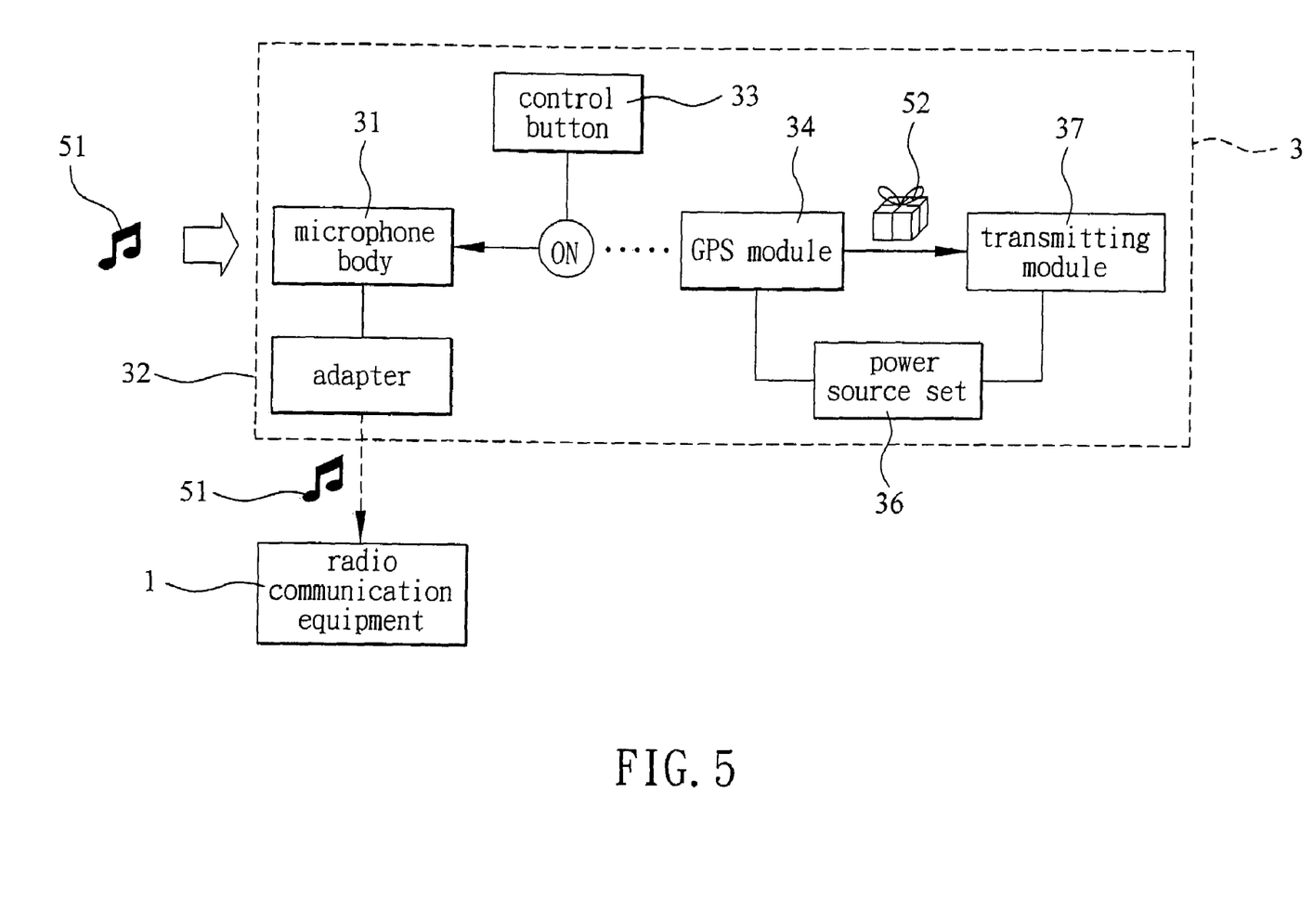
FIG. 5 illustrates a second embodiment of an extended microphone with a positioning display for a radio communication equipment according to the present invention.

Please refer to FIG. 5. It illustrates another embodiment of an extended microphone with a positioning display for a radio communication equipment 1 according to the present invention. The extended microphone of the present invention includes a microphone body 31; an adapter 32 for connecting the extended microphone with the radio communication equipment 1; a GPS module 34 disposed on the microphone body 31 for producing a positioning message 52; and a display module 35 disposed on the microphone body 31 and connected with the GPS module 34 for receiving the positioning message 52 and displaying the positioning message 52 thereon, thereby a user being able to acquaint his position and the information around the surrounding. Meanwhile, the positioning message 52 can be a data packet, and the display module 35 can be a liquid crystal display (LCD), wherein the positioning message 52 is displayed in form of characters or figures. In practice, the extended microphone further includes a power source set 36 connected with the GPS module 34 and the display module 35 for providing the extended microphone set with an individual power, wherein the power source set 36 is a battery.

Figure 6:
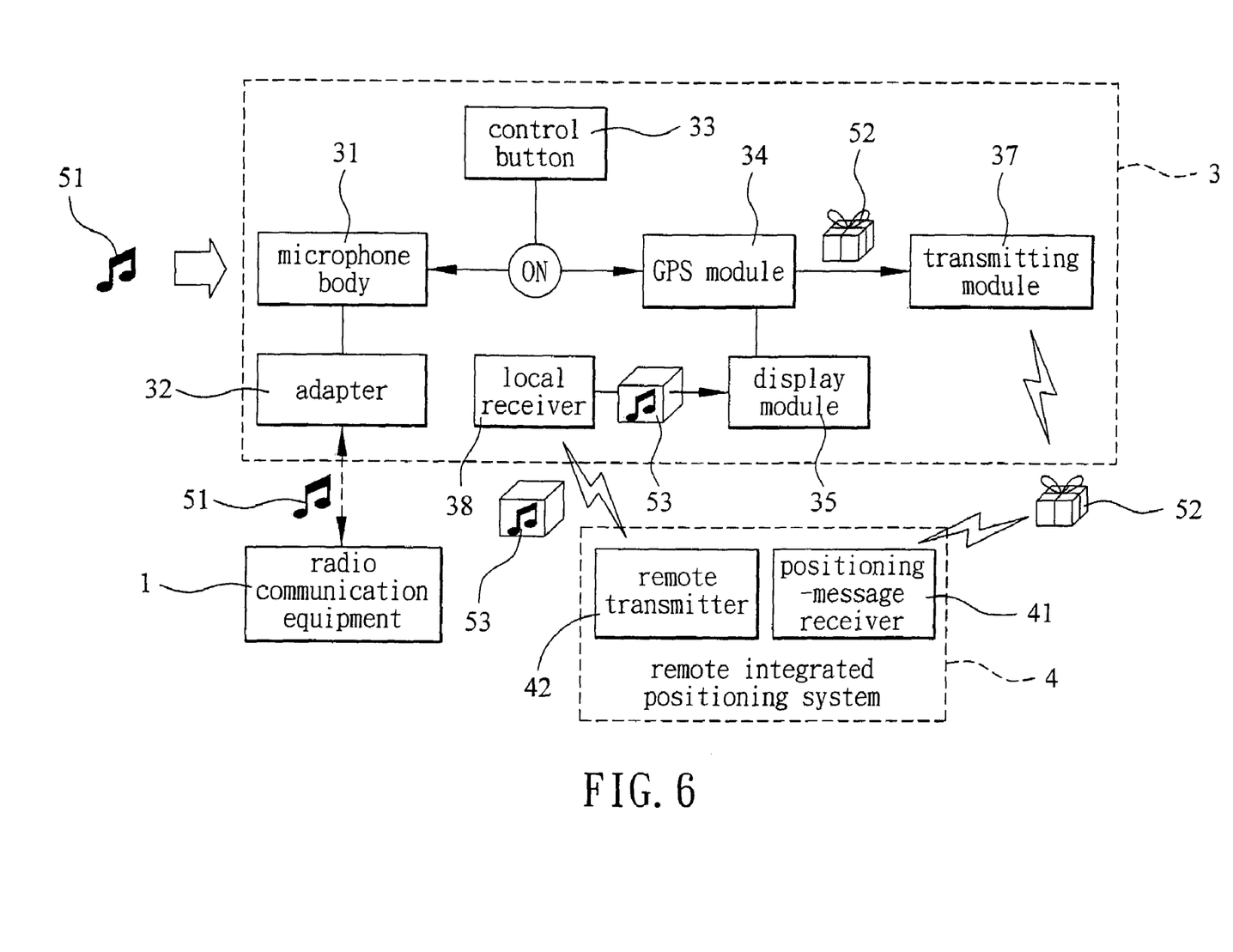
FIG. 6 illustrates a third embodiment of an extended microphone with a positioning display for a radio communication equipment according to the present invention.

It is another object of the present invention to provide an extended microphone system for radio communication equipments, wherein at least an extended microphone set with a positioning display is introduced for providing positioning service without refitting the radio communication equipment. Accordingly, please refer to FIG. 6; the extended microphone system for a radio communication equipment includes at least an extended microphone set and a remote integrated positioning system. Meanwhile the extend microphone set includes a microphone body 31; an adapter 32 for connecting the extended microphone with the radio communication equipment 1; a voice-receiving button 33 connected to the microphone body for enabling the microphone body 31 to receive a voice message 51, wherein the voice message 51 is further transmitted into the radio communication equipment 1; a GPS module 34 disposed on the microphone body 31 and connected to the voice-receiving button 331 for providing a positioning message 52; a transmitting module 37 connected with the GPS module 34 for transmitting the positioning message 52; a display module 35; and a local receiver 38 connected with the display module 35. On the other hand, the remote integrated positioning system 4 for providing a condition message further includes a positioning-message receiver 41 disposed in the remote integrated positioning system 4 to receive the positioning message 52 of the extended microphone set for acquainting the position of the radio communication equipment 1 thereby obtaining the condition message 53; and a remote transmitter 42 disposed in the remote integrated positioning system 4 to transmitting the condition message 53 to the local receiver 38 of the extended microphone set thereby displaying the condition message 52 via the display module 35 of the extended microphone set.

Figure 7:
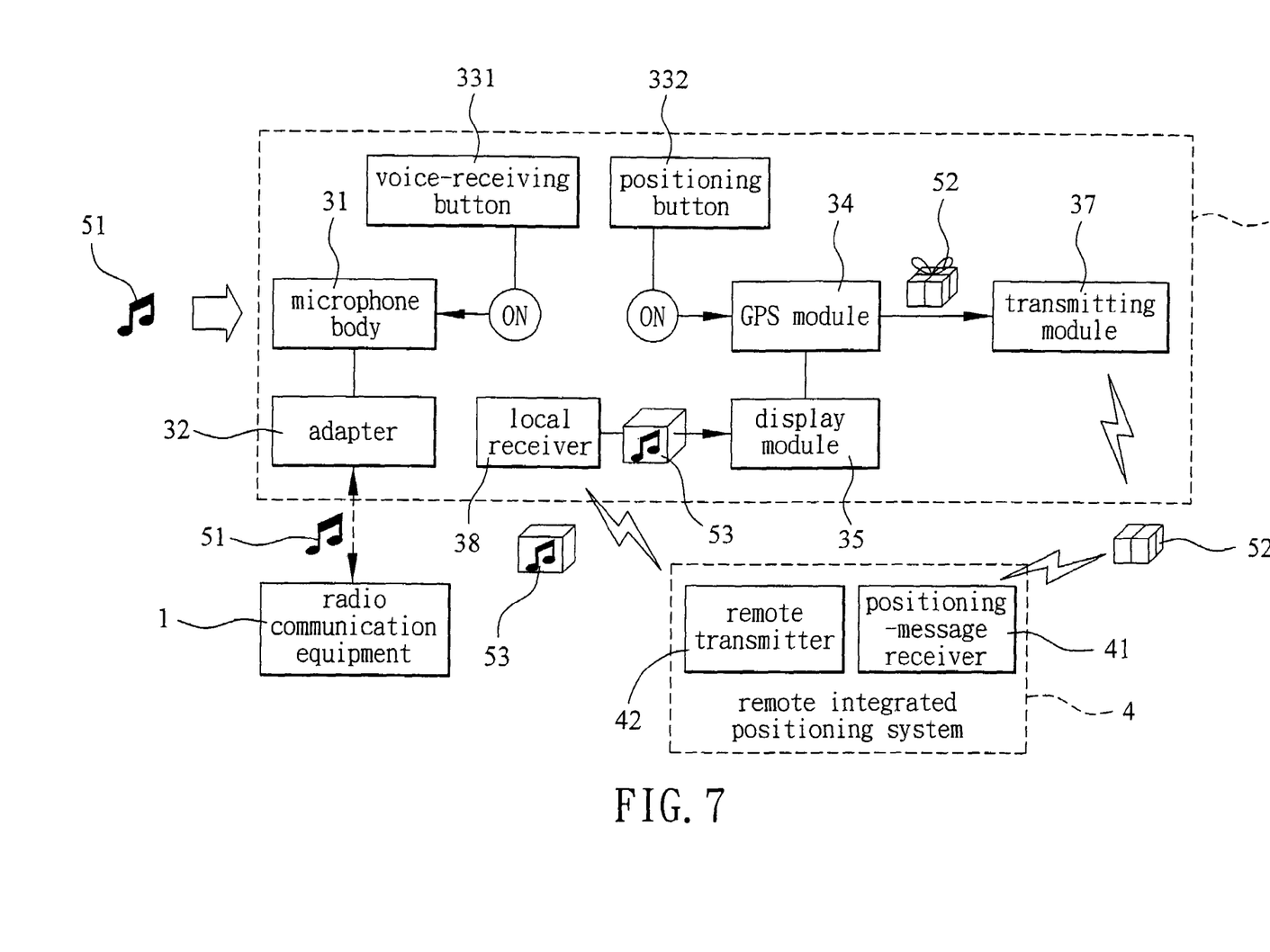
FIG. 7 illustrates a fourth embodiment of an extended microphone with a positioning display for a radio communication equipment according to the present invention.
Figure 8:
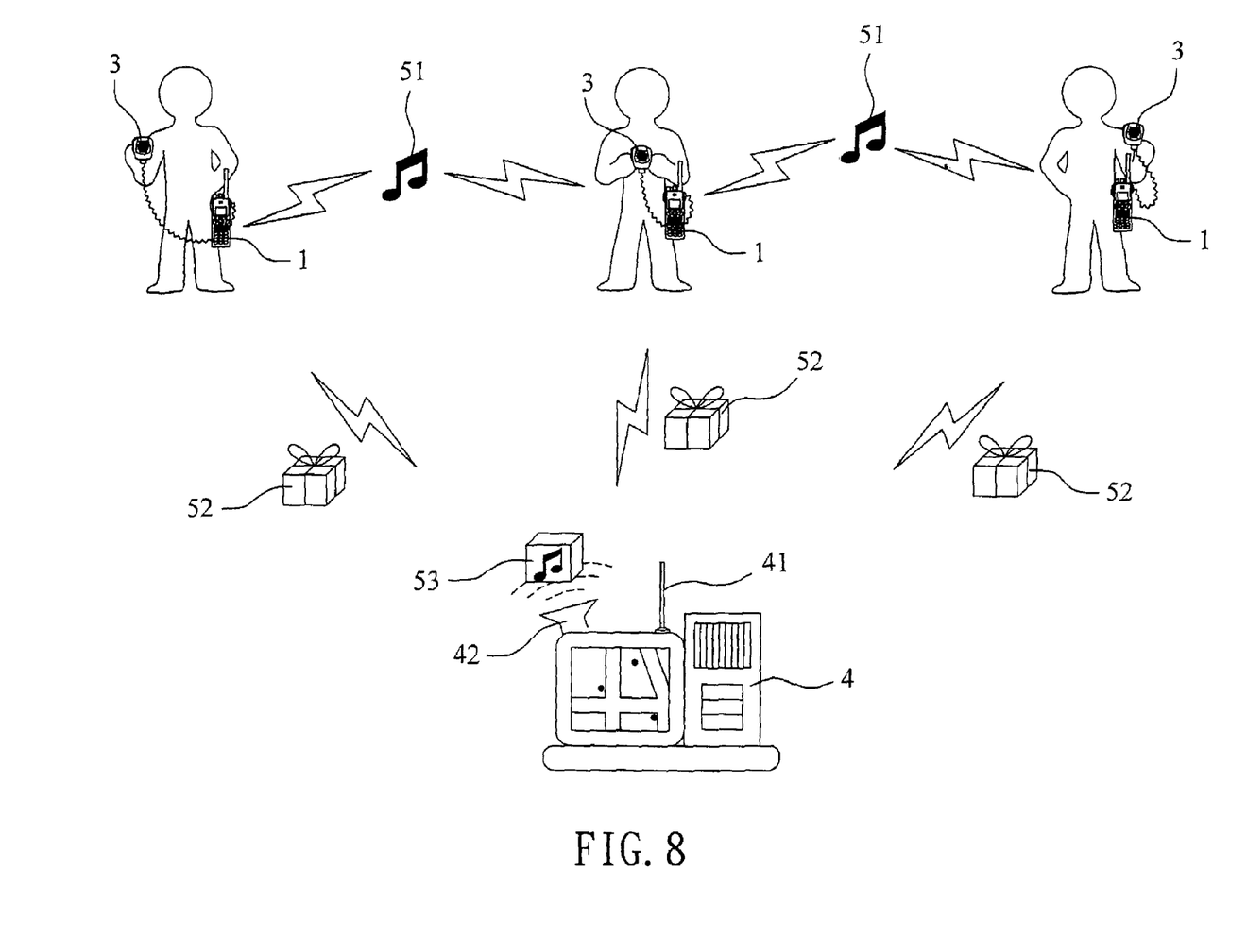
FIG. 8 illustrates a functional diagram of an extended microphone system with positioning display according to the present invention.

Please refer to FIG. 7 and FIG. 8. They illustrate other embodiment of an extended microphone system for radio communication equipments according to the present invention. As shown in figures, the extended microphone system for radio communication equipments includes plural extended microphone set 3 and a remote integrated positioning system 4. Meanwhile each the extend microphone set 3 includes a microphone body 31; an adapter 32 for connecting the extended microphone with the radio communication equipment 1; a GPS module 34 disposed on the microphone body 31 and connected to the voice-receiving button 331 for providing a positioning message 52; a transmitting module 37 connected with the GPS module 34 for transmitting the positioning message 52; a display module 35; and a local receiver 38 connected with the display module 35. On the other hand, the remote integrated positioning system 4 for providing a condition message further includes a positioning-message receiver 41 disposed in the remote integrated positioning system 4 to receive the positioning message 52 of the extended microphone set for acquainting the position of the radio communication equipment 1 thereby obtaining the condition message 53; and a remote transmitter 42 disposed in the remote integrated positioning system 4 to transmitting the condition message 53 to the local receiver 38 of the extended microphone set thereby displaying the condition message 52 via the display module 35 of the extended microphone set 3. Therefore, a user could acquaint his position, other user's positions, and the information around the surrounding. Meanwhile, the positioning message 52 can be a data packet, and the display module 35 can be a liquid crystal display (LCD), wherein the positioning message 52 is displayed in form of characters or figures.

In practice, the extended microphone set 3 further includes a voice-receiving button 33 connected to the microphone body for enabling the microphone body 31 to receive a voice message 51, wherein the voice message 51 is further transmitted into the radio communication equipment 1. Certainly the extended microphone set 3 further includes a positioning button 332 connect with the GPS module 34 for producing the positioning message 52. Furthermore, the GPS module 34, the transmitting module 37, the local receiver 38, and the display module 35 are connected with a power source set 36 for providing the extended microphone set with an individual power, wherein the power source set 36 is a battery. The power source set 36 is independent of the powder system of the radio communication equipment 1. Thus, the GPS module 34, the transmitting module 37, the local receiver 38, and the display module 35 could keep working for providing positioning service while the power system of the radio communication equipment 1 is broken or out of.

Accordingly, the present invention provides an extended microphone for a radio communication equipment by introducing a GPS module and a display module thereby providing a positioning service without refitting the relative radio communication equipment. Obviously, the present invention possesses many outstanding characteristics, effectively improves upon the drawbacks associated with the prior art in practice and application, produces practical and reliable products, bears novelty, and adds to economical utility value. Therefore, the present invention exhibits a great industrial value.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. An extended microphone system for a radio communication equipment, comprising:
at least an extended microphone set, wherein said extend microphone set comprises:
a microphone body;
an adapter for connecting said extended microphone with said radio communication equipment;
a voice-receiving button connected to said microphone body for enabling said microphone body to receive a voice message, wherein said voice message is further transmitted into said radio communication equipment;
a GPS module disposed on said microphone body and connected to said voice-receiving button for providing a positioning message;
a transmitting module connected with said GPS module for transmitting said positioning message;
a display module; and
a local receiver connected with said display module; and
a remote integrated positioning system for providing a condition message, wherein said remote integrated positioning further comprises:
a positioning-message receiver disposed in said remote integrated positioning system to receive said positioning message of said extended microphone set for acquainting the position of said radio communication equipment thereby obtaining said condition message; and
a remote transmitter disposed in said remote integrated positioning system to transmitting said condition message to said local receiver of said extended microphone set thereby displaying said condition message via said display module of said extended microphone set.

2. The extended microphone system according to claim 1, wherein said voice message is an analogous signal and said positioning message and said condition message are both data packets.

3. The extended microphone system according to claim 1 further comprising a power source set for providing said extended microphone set with an individual power, wherein said power source set is a battery.

4. The extended microphone system according to claim 1, wherein said display module is a liquid crystal display (LCD).

5. The extended microphone system according to claim 1, wherein said extended microphone set further comprising an extended line connected between said microphone body and said adapter.

6. An extended microphone system for a radio communication equipment, comprising:
plural extended microphone sets, wherein each said extend microphone set comprises:
a microphone body;
an adapter for connecting said extended microphone with said radio communication equipment;
a GPS module disposed on said microphone body for providing a positioning message;
a transmitting module connected with said GPS module for transmitting said positioning message;
a display module; and
a local receiver connected with said display module; and
a remote integrated positioning system for providing a condition message, wherein said remote integrated positioning further comprises:
a positioning-message receiver disposed in said remote integrated positioning system to receive said positioning message of said extended microphone set for acquainting the position of said radio communication equipment thereby obtaining said condition message; and
a remote transmitter disposed in said remote integrated positioning system to transmitting said condition message to said local receiver of said extended microphone set thereby displaying said condition message via said display module of said extended microphone set.

7. The extended microphone system according to claim 6, wherein said extended microphone set further comprises a positioning button connected to said GPS module for controlling said GPS module to producing said positioning message.

8. The extended microphone system according to claim 6, wherein said extended microphone set further comprises a voice-receiving button connected to said microphone body for enabling said microphone body to receive a voice message, wherein said voice message is further transmitted into said radio communication equipment.

9. The extended microphone system according to claim 8, wherein said voice message is an analogous signal.

10. The extended microphone system according to claim 6, wherein said positioning message is a data packet.

11. The extended microphone system according to claim 6, where said condition message is a data packet.

12. The extended microphone system according to claim 6, wherein said extend microphone set further comprises a power source set for providing said extended microphone set with an individual power.

13. The extended microphone system according to claim 6, wherein said display module is a liquid crystal display (LCD).

14. The extended microphone system according to claim 6, wherein said extended microphone set further comprising an extended line connected between said microphone body and said adapter.

* * * * *